United States Patent [19]

Benson et al.

[11] 4,222,040
[45] Sep. 9, 1980

[54] CYCLE-TYPE VEHICLE ATTACHMENT

[75] Inventors: Mason Benson; James McIntosh, both of New York, N.Y.

[73] Assignee: Carolina Enterprises, Inc., New York, N.Y.

[21] Appl. No.: 915,924

[22] Filed: Jun. 15, 1978

[51] Int. Cl.³ .............................................. G08B 3/10
[52] U.S. Cl. ............................. 340/384 E; 340/384 R
[58] Field of Search .............. 340/384 E, 384 R, 134; 116/142

[56] References Cited

U.S. PATENT DOCUMENTS

| 2,903,648 | 9/1959 | Bonner | 340/384 E |
| 3,487,404 | 12/1969 | Midkiff | 340/384 E |
| 3,905,016 | 9/1975 | Peterson | 340/384 E |

*Primary Examiner*—Harold I. Pitts
*Attorney, Agent, or Firm*—Krischstein, Kirschstein, Ottinger & Cobrin

[57] ABSTRACT

A siren having electronic components is mounted on a cycle-type pedal-powered handle-barred vehicle. The components are actuated by a remote momentary action push button switch mounted on the handlebar of the vehicle at a location away from the siren. A multi-part kit including brackets, bolts, nuts and analogous hardware is employed to mount the siren on and to tilt the siren relative to the vehicle. The kit permits a user the option of mounting the siren on either a bicycle, or a tricycle, or a low-slung children's tricycle.

27 Claims, 8 Drawing Figures

CYCLE-TYPE VEHICLE ATTACHMENT

BACKGROUND OF THE INVENTION

1. Field of the Invention

The present invention generally relates to attachments for cycle-type pedal-powered handle-barred vehicles and, more particularly, to an all-electronic siren-type attachment for vehicles such as bicycles, tricycles and low-slung children's tricycles.

2. Description of the Prior Art

All-electronic sirens relate to those sirens in which a variable pitch ululating audible sound is produced by first generating an audio frequency electrical carrier signal lying in the range of frequency to which the human ear is sensitive, thereupon modulating the frequency of the carrier signal, and thereupon conducting the modulated carrier signal to a loudspeaker from which the siren-type sound is emitted. These all-electronic sirens are to be distinguished from and contrasted with other type of audible signal devices well known in the art such as air whistles, mechanical horns, bells, buzzers, toy machine gun noise makers and the like, in which the audible sound is not derived from an electrical signal, but rather is derived from some form of mechanical means.

In recent years, all-electronic sirens have come into widespread acceptance in emergency-type applications such as police cars, fire engines, motor boats, ambulances and burglar and fire alarm systems. Due to the high reliability and opperability requirements of such emergency-type system applications, the associated electronic circuitry designs have proven to be complex, to require a great number of electrical components, to require a relatively large amount of working space, and to be very expensive to manufacture. In order to protect such complex and expensive sirens from theft, these electronic sirens are typically permanently installed or secreted within the associated system.

Due in part to the known complex and expensive circuit designs for such electrical sirens, it has heretofore been unknown to the best of our knowledge to install electronic sirens on cycle-type pedal-powered handle-barred vehicles, such as bicycles, tricycles, or low-slung children's tricycles. It is, of course, known to mount the above-described mechanical-type noise makers on a cycle-type vehicle. However, it is very desirable to adjustably mount at a prominent forward region of a cycle-type vehicle an all-electronic siren capable of emitting a very loud, variable pitch, ululating siren-type sound. The known arrangements for mounting mechanical-type noise makers have not proven to be altogether satisfactory, nor readily and quickly detachable from one cycle-type vehicle to thereby quickly mount the noise maker on another cycle-type vehicle.

SUMMARY OF THE INVENTION

Objects of the Invention

Accordingly, it is the general object of the present invention to overcome the aforementioned drawbacks of the prior art.

Another object of the present invention is to provide a novel and improved all-electronic siren embodied in a highly compact, solid-state form involving but a few inexpensive and non-critical components arranged in a non-complex and reliable circuit configuration.

Still another object of the present invention is to provide an all-electronic siren which is of simple construction, is easy to manufacture, has a minimum number of parts, is efficient in use, and is durable and self-contained.

Yet another object of the present invention is to provide a multi-part kit for quickly mounting a siren-type attachment on many different types of cycle-type vehicles.

An additional object of the present invention is to reliably actuate the electronic components of the siren at a location remote from the latter.

Features of the Invention

In keeping with these objectives and others which will become apparent hereinafter, one feature of the invention resides, briefly stated, in an attachment for cycle-type pedal-powered handle-barred vehicles, particularly bicycles, tricycles, and low-slung children's vehicles, of the type having child hand-operated multi-element means for steering the cycle-type vehicles over a surface to be traversed.

The attachment comprises a synthetic plastic material housing which is elongated along an axis of symmetry. The housing has a generally cylindrical end portion and an opposite end portion which flares outwardly in direction away from the generally cylindrical end portion. The housing also has longitudinal-extending partition wall means of one-piece with the housing and operative for subdividing the interior of the housing into separate compartments, one of the compartments being elongated and having an open end region and an opposite end region. The housing further has a mounting portion of one-piece with and extending in a generally radial direction outwardly of the housing, the mounting portion having a transversely-extending passage formed with opposite open ends. The above-described streamlined shape of housing is particularly attractive and esthetically pleasing.

The attachment further comprises a unitary carrier mounted for sliding movement in said one compartment through the open end region of the latter, and a small light dc battery power source receivable in another of the compartments of the housing. The power source includes a pair of batteries and a battery holder for supporting the latter. The above-described provision of a unitary carrier and a battery holder greatly simplifies the assembly of the siren.

The attachment still further comprises multi-component means for electronically generating a variable pitch ululating siren-type sound which includes oscillator means for generating an audio carrier signal having a predetermined frequency, switching means for generating a modulating signal having a frequency less than the predetermined frequency, the oscillator means and the switching means comprising a plurality of actuatable transistor components, resistor components and capacitor components all mounted on the unitary carrier, feedback means for electrically interconnecting the components to thereby modulate the audio carrier signal with the modulating signal, and the loudspeaker means on the housing for converting the modulated carrier signal to the siren-type sound. The above-described siren-type sound generating means permits the electrical circuit design to be reliably embodied in a highly compact, solid-state form using but a few inexpensive and non-critical components.

In accordance with another feature of the invention, the attachment comprises anti-tampering safety means for preventing unauthorized contact with the components on the carrier. The safety means includes a transversely-extending abutment wall of one-piece with the housing and with the partition wall means, the abutment wall overlying the opposite end region of said one compartment; and a transversely-extending shield wall mounted on the movable carrier, said shield wall being located intermediate the components and the abutment wall. The above-described anti-tampering safety feature reliably prevents a rider, particularly a child, from damaging or being injured by the electrical components.

The attachment still further comprises means for actuating the components of the siren-type sound generating means. The actuating means includes normally-open electrical circuit means for normally disconnecting the power source from the components to thereby minimize battery drain, and hand-operated switching means for closing the normally-open circuit means to thereby connect the power source with the components and generate the siren-type sound. Means are provided for adjustably mounting the actuating means at any selected position along the length of a handlebar element of the multi-element steering means. This mounting means includes a casing on which the actuating means is mounted, a pair of clamping arms depending from opposite sides of the casing, and clamping means for urging the arms towards each other and into clamping engagement with the handlebar element. The above-described arrangement for mounting the actuating means permits the rider to not only have easy access to the actuating means, but also permits him to quickly install the actuating means on any selected vehicle and to move the actuating means to another location if desired.

Still another feature of the attachment is embodied in multi-part kit means for mounting the housing at any highly visible and elevated position on the steering means. The kit means includes a mounting bracket having one bracket portion connected to the housing, and another bracket portion connected to the vehicle to thereby mount the siren-type sound generating means on a prominent forward region of the vehicle. The first-mentioned bracket portion has a pair of flange arms on opposite sides of the mounting portion, and each flange arm has a through-hole which overlies and is registered with a respective open end of the passage. The kit means further includes means for adjustably orienting the housing on the steering means by tilting the axis of symmetry relative to the surface to be traversed. This adjustable orienting means includes an elongated pivot element which extends through the passage and the holes and which defines a pivot axis along its elongation, and a movable locking element mounted on the pivot element for movement lengthwise of the latter between a non-locking position in which the housing is free to pivot about the pivot axis, and a locked position in which undesired pivoting movement of the housing about the pivot axis is prevented. The above-described multi-part kit means permits the rider to quickly mount the housing on any selected vehicle and to move the housing to another vehicle if desired. Moreover, the kit means permits the rider to quickly tilt and lock the siren to the desired tilt angle relative to the surface to be traversed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figures 1, 2, 4:
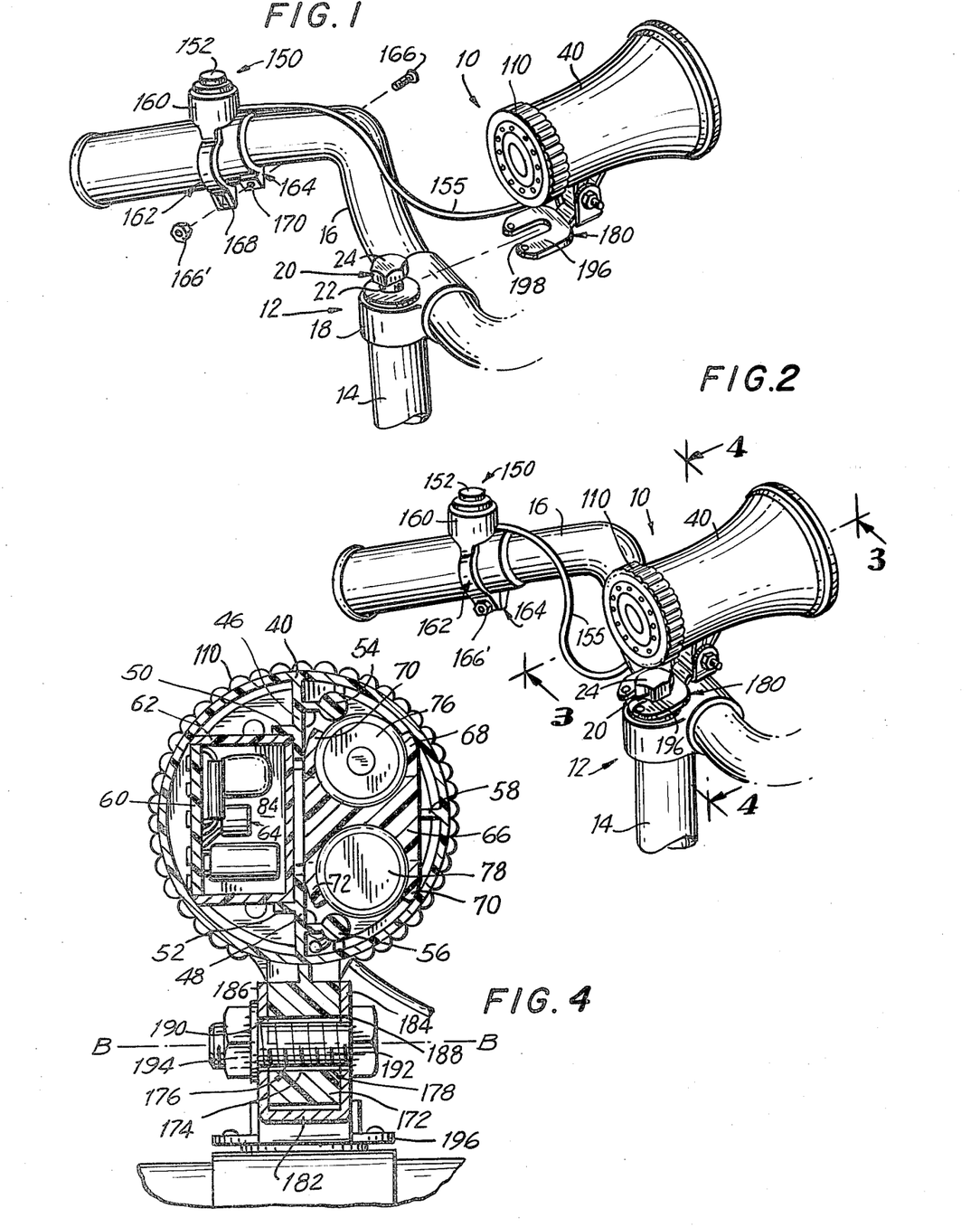
FIG. 1 is a perspective view of a cycle-type vehicle attachment prior to installation on a partially-illustrated pedal-powered handle-barred bicycle- or tricycle-type vehicle in accordance with one mounting arrangement of the present invention.
FIG. 2 is a perspective view of the attachment of FIG. 1 after installation on the bicycle- or tricycle-type vehicle has been completed.
FIG. 4 is a partially broken-away, cross-sectional view as taken along line 4—4 of FIG. 2.

Referring now to the drawings and particularly to FIG. 1 thereof, reference numeral 10 generally identifies a cycle-type vehicle attachment for conventional cycle-type footpedal-powered handle-barred vehicles such as bicycle, tricycles, and low-slung synthetic plastic material children's tricycles.

FIGS. 1 and 2 show how the attachment 10 is mounted on a bicycle- or tricycle-type vehicle 12 having a non-illustrated conventional front fork in which the footpedal-driven front wheel is journaled. The front fork includes a steering column 14 to which a multi-element steering assembly including handlebar 16 is fixedly mounted by bracket element 18 and fastener element or bolt 20. Bolt 20 has a threaded rod-shaped stem 22 which is threadedly mounted on the upper end of steering column 14, and a head 24 for tightly securing the handlebar assembly to the steering column 14 when the bolt 20 is fully threaded into the column 14 as best shown in FIG. 2.

Figure 6:
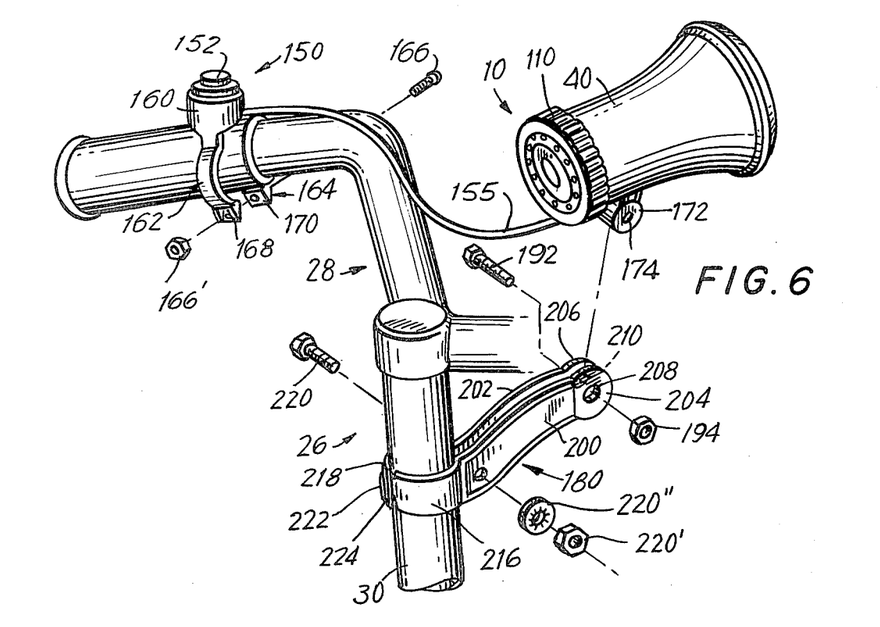
FIG. 6 is a perspective view of the cycle-type vehicle attachment of FIG. 1 prior to installation on a partially-illustrated pedal-powered handle-barred bicycle- or tricycle-type vehicle different from the vehicle shown in FIG. 1 in accordance with another mounting arrangement of the present invention.

FIG. 6 shows how the attachment 10 is mounted on a different type of bicycle- or tricycle-type vehicle 26 which does not have a fastener element analogous to bolt 20 threadedly mounted on the vehicle. Instead, the handlebar steering assembly 28 is non-detachably connected to the upper end of steering column 30 by press-fit, welding or like joining techniques.

Figure 7:
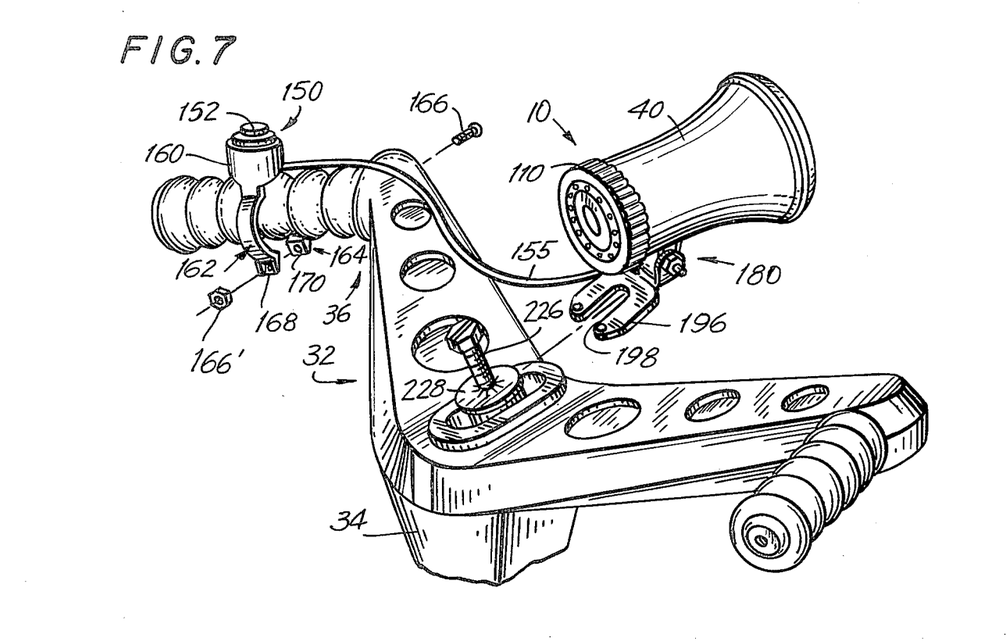
FIG. 7 is a perspective view of the cycle-type vehicle attachment of FIG. 1 prior to installation on a partially-illustrated pedal-powered handle-barred low-slung children's tricycle-type vehicle in accordance with still another mounting arrangement of the present invention.

FIG. 7 shows how the attachment 10 is mounted on a low-slung children's tricycle whose frame is essentially comprised of blow-molded synthetic plastic material parts. This type of children's tricycle typically has a low center of gravity seat for the rider, and a relatively large diameter front wheel which is journaled in a synthetic plastic material handlebar assembly 32 having a steering post 34 of one-piece with the latter, and a handlebar 36 adapted to be grasped by the hand of a child rider.

In accordance with the present invention, the attachment 10 can be mounted on either vehicle 12, or vehicle 26, or vehicle 32, or on any other analogous vehicle tuype in accordance with the various mounting arrangements described in detail below.

Figure 3:
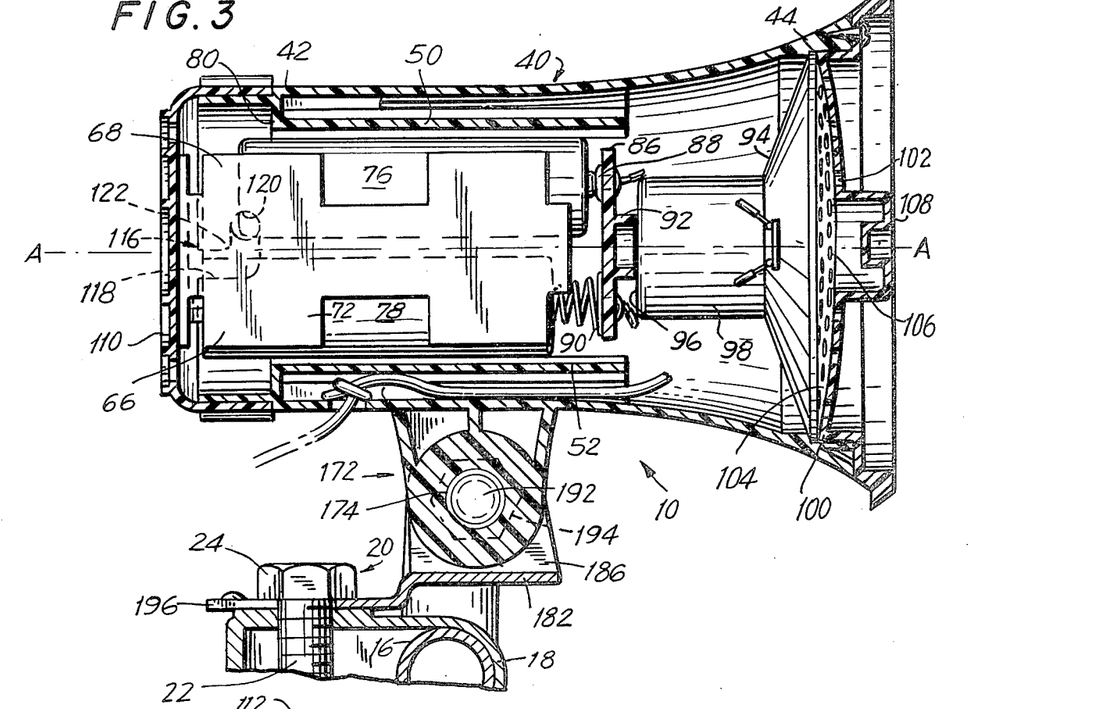
FIG. 3 is a partially broken-away, longitudinal sectional view as taken along line 3—3 of FIG. 2.

Turning now more particularly to FIGS. 3 and 4, the attachment 10 comprises a resilient synthetic plastic material trumpet-shaped housing 40 elongated along an axis of symmetry A—A and having a generally cylindrical rear end portion 42, and an opposite front end portion 44 which flares outwardly in direction away from rear portion 42. The interior of housing 40 is subdivided into separate compartments by a plurality of partition walls of one-piece with the housing. Longitudinally-extending walls 46, 48 subdivide the housing interior generally into two main compartments. Longitudinally-extending guide walls 50, 52 at opposite sides of the axis of symmetry extend from partition walls 46, 48 inwardly into one main compartment. A plurality of longitudinally extending ribs 54, 56, 58 of one-piece with the housing extend inwardly into the other main compartment. Ribs 54, 56 are formed of one-piece with partition walls 46, 48 at opposite sides of the axis of symmetry, and each rib 54, 56 is formed with a resilient bulbous head. Rib 58 extends from the inner circumferential surface of the housing 40.

A unitary carrier plate such as printed circuit board 60 is receivable in said one compartment. As will be described in greater detail below, a multi-component means 64 for electronically generating a variable pitch ululating siren-type sound is mounted on the circuit board 60. A synthetic plastic material casing 62 is placed over the multiple electronic components 64 on circuit board 60 to thereby enclose the upper and side regions of the components 64. The casing 62 is mounted on partition walls 46, 48 and on guide walls 50, 52 for sliding movement relative to the housing when the casing 62 is inserted through the rear open end portion 42 of the housing. The guide walls 50, 52 also serve to prevent unauthorized shifting or lateral displacement of the carrier or the components within said one compartment.

A synthetic plastic material battery holder 66 has at least one pair of opposed resilient fingers 68 and 70 operative for supportably holding battery 76, and another analogous pair of fingers 72 and 74 operative to supportably hold battery 78. Each battery is relatively small and light in weight; for example, a 1.5 dc volts size AA battery being preferred. The battery holder 66 and the batteries 76, 78 mounted thereon are received in said other main compartment. The aforementioned ribs 54, 56, 58 frictionally engage the batteries and/or the battery holder at different opposed locations to thereby prevent unauthorized shifting or lateral displacement of the battery holder and its batteries within said other battery compartment.

Figure 5:
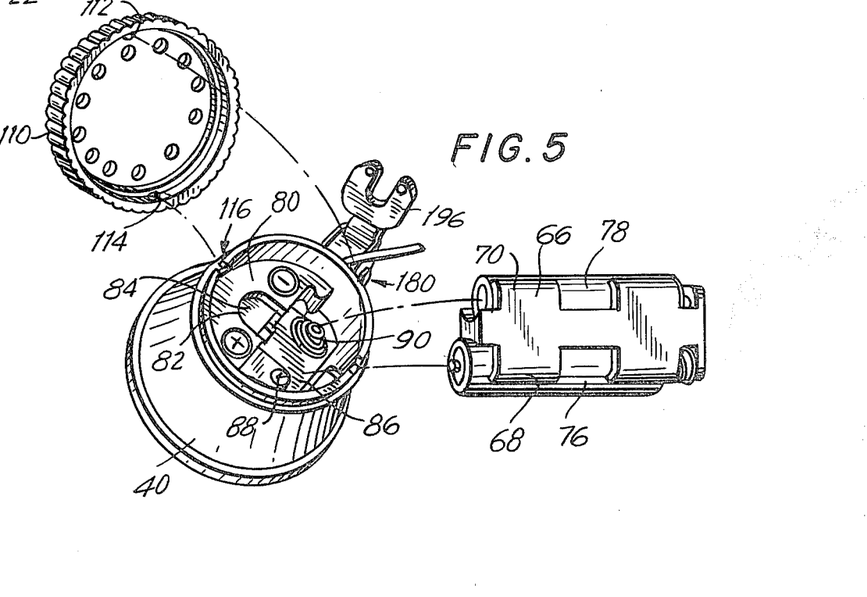
FIG. 5 is a rear assembly view diagrammatically showing how the battery holder and the rear cover are mounted on the attachment of FIG. 1.

In further accordance with the present invention, anti-tampering safety means are provided for preventing unauthorized contact with the components 64 on the carrier 60. It is highly desirable to prevent a user, particularly a child, from inserting a finger or a tool through the rear open end portion 42 of the housing and doing damage to the components 64 thereby. Conversely, it is very desirable to protect the child from injury to a possible electrical shock hazard. Hence, the anti-tampering means includes a transversely-extending abutment wall 80 of one-piece with the housing 40 and also with the partition walls 46, 48. Abutment wall 80 is generally semi-circularly shaped and has a U-shaped access cutout 82. The anti-tampering means further includes a transversely-extending shield wall 84 of one-piece with casing 62. Shield wall 84 is located intermediate the components 64 and the abutment wall 80. As best shown in FIG. 5, the shield wall 84 is visible through the cutout 82 and underlies the abutment wall 80. A user is thus reliably prevented from reaching and making contact with the electronic components 64. For authorized disassembly and repair purposes, a workman can push the casing 62 from its compartment by urging a finger or a tool through the access cutout 82 towards the front flaring end portion 44 assuming, of course, that the loudspeaker cone 94 has been removed from its position at the flaring end portion 44.

A terminal plate 86 is of one-piece with the casing 62 and extends into the battery compartment. A positive polarity terminal 88 and a negative polarity terminal 90 are mounted at one side of plate 86. When the batteries are mounted in the battery compartment, the positive and negative battery posts respectively engage the terminals 88 and 90. An annular raised stop 92 is mounted on the other side of plate 86. Stop 92 abuts against the rear wall 96 of the transformer housing 98 of the loudspeaker cone 94.

In order to protect the loudspeaker cone 94 from damage, a synthetic plastic material protective front cover 100 is threadedly mounted at the flaring end portion 44. Front cover 100 has a plurality of relatively large-sized holes 102 to permit the siren-type sound generated by the components 64 to be emitted. A relatively thin metal disc or protective screen 104 is mounted intermediate the front cover 100 and the cone 94. Screen 104 has a much larger plurality or multitude of relatively smaller-sized apertures 106 for preventing dust particles smaller than the holes 102 but greater than the apertures 106 from reaching the cone 94. If desired, a non-illustrated very thin flexible synthetic plastic material film can be inserted between screen 104 and the front cover 100 to block entry of dust particles during forward movement of the vehicle over a surface to be traversed. A wind baffle or outwardly-extending projection 108 is centrally located on front cover 100 to thereby divert oncoming air flow in direction generally radially away from the axis of symmetry A—A.

A rear turn-type cover 110 is mounted at the cylindrical end portion 42. Rear cover 100 has a knurled or roughened outer surface, and a pair of inwardly-directed bayonet-type projections 112, 114 on its inner surface. Each projection 112, 114 is receivable in a pair of L-shaped notches at opposite sides of the cylindrical end portion 42. As best shown by dashed lines in FIG. 3, representative notch 116 has a first longitudinally-extending section 118 operative for axially receiving the respective projection 114, and a second circumferentially-extending section 120 operative for locking the rear cover 110 on the cylindrical end portion 42 when the cover is turned through a slight angular distance in circumferential direction. An undercut 122 serves to keep the respective projection from unauthorized disengagement from the housing.

Figure 8:
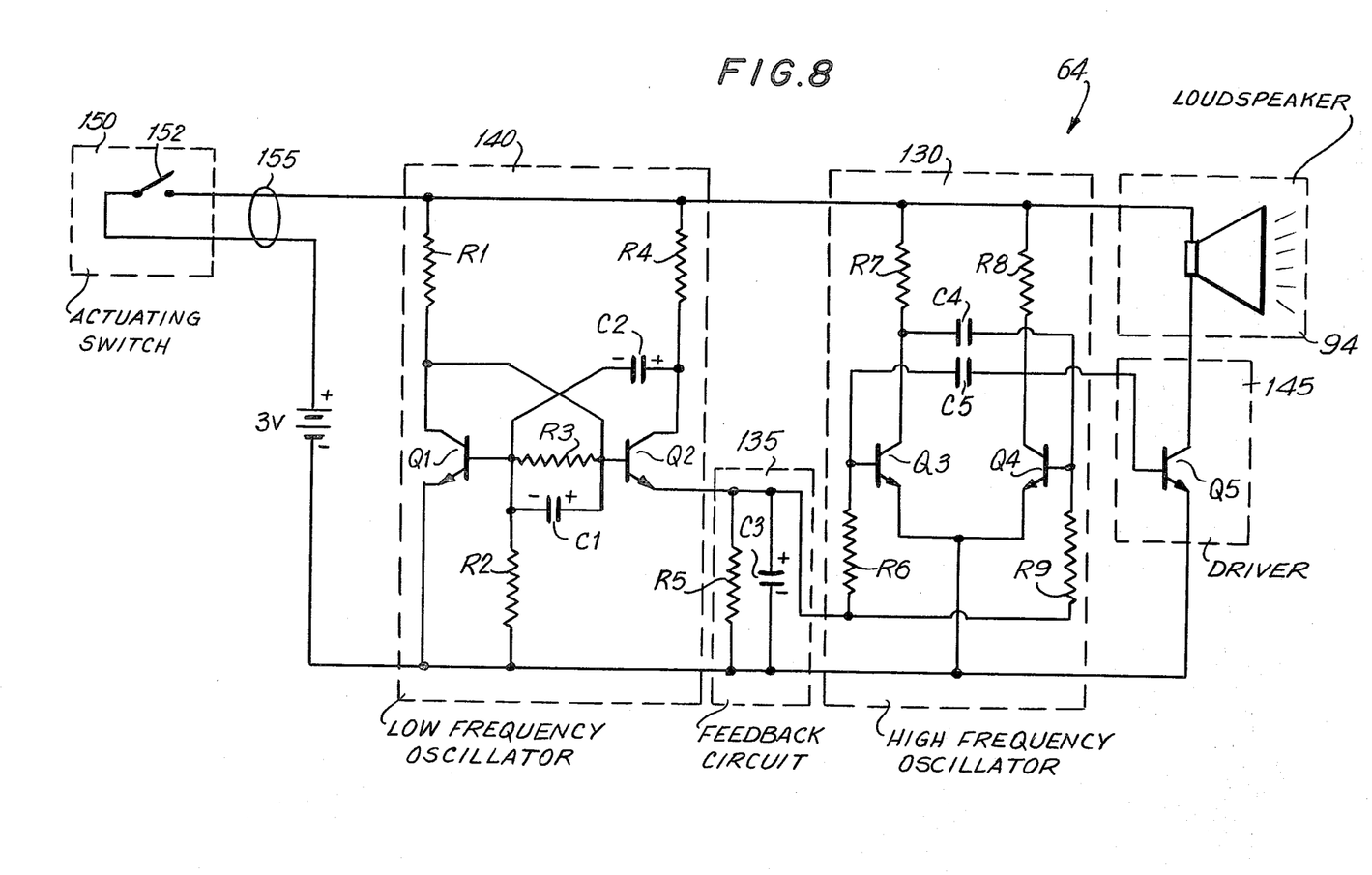
FIG. 8 is a schematic diagram of a circuit for electronically generating a variable pitch ululating siren-type sound.

Turning now to FIG. 8, the siren-type sound generating means 64 includes high frequency oscillator circuit or oscillator means 130 for generating an audio carrier signal having a predetermined high frequency, low frequency oscillator circuit or switching means 140 for generating a modulating signal having a low frequency less than said predetermined frequency, feedback circuit means 135 for electronically interconnecting the oscillator means 130 and the switching means 140 to thereby modulate the audio carrier signal with the modulating signal, and driver means 145 to amplify the modulated carrier signal before the latter is conducted to loudspeaker 94 wherein the amplified and modulated carrier signal is converted to the siren-type audible sound.

The low frequency oscillator circuit 140 includes a pair of transistors $Q_1$ and $Q_2$ each having a base, a collector and an emitter. The collectors of transistors $Q_1$ and $Q_2$ are operatively respectively connected to the positive side of the battery source through resistors $R_1$ and $R_4$. The bases of transistors $Q_1$ and $Q_2$ are operatively connected together through resistor $R_3$. A capacitor $C_1$ is connected in parallel across resistor $R_3$. The collector of transistor $Q_1$ is connected directly to the base of transistor $Q_2$; and the collector of transistor $Q_2$ is connected to the base of transistor $Q_1$ through capacitor $C_2$. A resistor $R_2$ connects the common junction at which the base of transistor $Q_1$, one side of capacitor $C_2$, one side of resistor $R_3$, and one side of capacitor $C_1$ all meet to the negative side of the battery.

The high frequency oscillator circuit 130 includes another pair of transistors $Q_3$ and $Q_4$ each having a base, a collector and an emitter. The collectors of transistors $Q_3$ and $Q_4$ are respectively operatively connected to the positive side of the battery source through resistors $R_7$ and $R_8$. The emitters of transistors $Q_3$ and $Q_4$ are connected to the negative side of the battery source. The bases of transistors $Q_3$ and $Q_4$ are connected together through resistors $R_6$ and $R_9$. The collector of transistor $Q_3$ is connected to the base of transistor $Q_4$ through capacitor $C_4$.

The feedback circuit 135 includes a combination of a resistor $R_5$ and a capacitor $C_3$ connected in parallel across the latter. One side of this combination is connected to the emitter of transistor $Q_2$ and to the junction between resistors $R_6$ and $R_9$. The other side of this combination is connected to the negative side of the battery.

The modulated audio carrier signal is conducted from the base of transistor $Q_3$ through capacitor $C_5$ and to the driver or transistor amplifier $Q_5$.

All of the above-mentioned actuatable transistors, resistors and capacitors are mounted on the printed circuit board 60. The following components and/or component values may, for example, be used for the circuit shown in FIG. 8, but it is to be understood that these components and/or component values are not to be considered to in any way limit the scope of the invention.

| Resistors | Capacitor | Loudspeaker |
|---|---|---|
| $R_1$ = 2.2 Kohms | $C_1$ = 1 mfd | 8 Ohms, 0.2 watts |
| $R_2$ = 22 Kohms | $C_2$ = 10 mfd | |
| $R_3$ = 4.7 Kohms | $C_3$ = 100 mfd | Transistors |
| $R_4$ = 470 Ohms | $C_4$ = .033 mfd | All NPN |
| $R_5$ = 12 Kohms | $C_5$ = .033 mfd | |
| $R_6$ = 39 Kohms | | |
| $R_7$ = 18 Kohms | | |

-continued

| | | |
|---|---|---|
| $R_8$ = 470 Ohms | | |
| $R_9$ = 18 Kohms | | |

In order to actuate the above-mentioned components to thereby generate the siren-type sound, a momentary action push button actuating switch 150 is mounted between the battery source and these various components. The actuating switch 150 is normally open and, as shown in FIG. 8, the battery source is normally disconnected from the multi-component siren-type sound generating means 64 to thereby minimize battery drain. Depression of the manual push button 152 is operative for closing the actuating switch 150 to thereby connect the battery source with the components to cause the siren-type sound to be emitted from the loudspeaker 94.

The actuating switch 150 is mounted at any selected position along the length of the handlebar of any selected one of the above-mentioned vehicles, and preferably on the handlebar grip adjacent the extreme end of the selected handlebar. A flexible electrical cable 155 conforms to and conveniently spans the adjustable distance between the selected position of the actuating switch 150 and the housing 40 in which the sound generating means 64 is located.

The actuating switch 150 is mounted on a synthetic plastic material generally cylindrical casing 160 from opposite sides of which a pair of one-piece clamping arms 162, 164 depend. Clamping means or bolt and nut assembly 166, 166' are operative to urge the clamping arms towards each other and into clamping engagement with either the handlebar grip or the respective handlebar itself. Each clamping arm is constituted by resilient material and has a generally semi-circular shape for closely embracing a respective circumferential portion of the circular handlebar and/or grip. Each clamping arm also has a tab portion 168, 170 formed with through-holes through which the bolt 166 passes.

As best shown in FIGS. 3 and 4, the housing 40 includes a mounting portion 172 of one-piece with and extending in generally radial direction outwardly of the housing 40. The mounting portion 172 has a transversely-extending through-passage 174 formed with opposite open ends 176, 178.

In further accordance with the present invention, multi-part kit means are provided for mounting the housing 40 at a highly visible and elevated position on the steering assembly of any selected one of the above-mentioned vehicles. The kit means includes a mounting bracket 180 having one bracket portion connected to the housing mounting portion 172, and another bracket portion connected to the respective cycle-type vehicle to thereby mount the sound generating means at a prominent forward region of the cycle type vehicle.

In the mounting arrangement of FIGS. 1-4, the mounting bracket 180 includes a generally planar body portion 182. A pair of flange arms 184, 186 project generally normally and upwardly of the body portion 182 at one end of the bracket 180. The flange arms are mounted on opposite sides of the mounting portion 172, and each arm has a through-hole 188, 190 which overlies and which is aligned with a respective open end 178, 176 of the passage 174.

The kit means further includes an elongated pivot element or threaded bolt 192 which extends through both the passage 174 and the aligned holes 188 and 190 and which defines a pivot axis B—B along the elongation of the bolt 192, and a movable locking element or threaded nut 194 threadedly mounted on the bolt 192 for movement lengthwise of the latter between a non-locking position in which the housing 40 is free to pivot about the pivot axis, and a locked position in which undesired pivoting movement of the housing about the pivot axis is prevented. By loosening the nut 194, the housing may be adjustably oriented or tilted relative to the handlebar steering assembly. Put another way, the axis of symmetry A—A is inclined at the desired tilt angle relative to the surface to be traversed. Once the desired tilt angle has been selected, the nut 194 is tightened on the bolt 192 to thereby urge the flange arms into clamping engagement with the mounting portion 172.

A slide lug 196 formed with a U-shaped recess 198 is mounted at the oppposite end of the bracket 180. The lug 196 lies in a plane offset from and generally parallel to that of the planar body portion 182.

In order to mount the attachment on the handlebar steering assembly of FIG. 1, the bolt 20 is loosened, and thereupon the lug 196 is slid underneath the head 24 until the U-shaped recess 198 receives the stem 22. The attachment is thereupon securely clamped on the steering assembly by fully tightening the bolt 20.

In the mounting arrangement of FIG. 6, the mounting bracket 180 includes a pair of metal bracket members 200, 202. Each bracket member has a flange arm 204, 206 mounted at opposite sides of the mounting portion 172. The flange arms 204, 206 have respective through-holes 208, 210 aligned with the passage 174. The above-described threaded bolt 192 and the threaded nut 194 are used in a manner analogous to that described above to mount, tilt and lock the housing 40 to the desired tilt angle for the mounting arrangement shown in FIG. 6.

At the opposite end of bracket 180 of FIG. 6, each bracket member 200, 202 has a respective semi-circular clamping portion 216, 218. Clamping means or bolt-nut-washer assembly 220, 220', 220" are operative to urge the clamping portions 216, 218 towards each other and into clamping engagement with the steering column 30. An interlocking bent projection 222 cooperates with an interlocking recess 224 on the respective clamping portions 216, 218 to thereby prevent the latter from moving apart from each other.

In the mounting arrangement of FIG. 7, the mounting bracket 180 is identical to that already described in FIGS. 1-4 and hence will not be repeated for the sake of brevity. For the synthetic plastic material steering assembly 32 of FIG. 7, the kit means provides a wood-type screw 226 having a puncture tip adapted to be driven into the plastic steering assembly 32. A shake-proof lockwasher 228 is also provided to help anchor the screw 226 on the steering assembly 32. The lug 196 is slid underneath the head of screw 226, and the attachment is thereupon securely clamped on the assembly 32 by fully tightening the screw 226.

It will be understood that each of the elements described above, or two or more together, may also find a useful application in other types of constructions differing from the types described above.

While the invention has been illustrated and described as embodied in a cycle-type vehicle attachment, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An attachment for cycle-type pedal-powered handle-barred vehicles, particularly bicycles, tricycles and low-slung children's vehicles, of the type having child hand-operated multi-element means for steering the cycle-type vehicles over a surface to be traversed, the attachment comprising:
    (a) a synthetic plastic material housing;
    (b) a unitary carrier receivable in said housing;
    (c) multi-component means for electronically generating a variable pitch ululating siren-type sound, including
        (i) oscillator means for generating an audio carrier signal having a predetermined frequency,
        (ii) switching means for generating a modulating signal having a frequency less than said predetermined frequency,
        (iii) said oscillator means and said switching means including a plurality of actuatable transistor components, resistor components and capacitor components, all mounted on said unitary carrier,
        (iv) feedback means for electrically interconnecting said components to thereby modulate said audio carrier signal with said modulating signal, and
        (v) loudspeaker means on said housing for converting the modulated carrier signal to the siren-type sound;
    (d) a small light dc battery power source receivable in said housing;
    (e) means for actuating said components of said siren-type sound generating means, including
        (i) normally-open electrical circuit means for normally disconnecting said power source from said components to thereby minimize battery drain, and
        (ii) hand-operated switching means on an element of the multi-element steering means for closing said normally-open circuit means to thereby connect said power source with said components and generate the siren-type sound; and
    (f) multi-part kit means for mounting said housing at a highly visible and elevated position on the steering means, including
        (i) a mounting bracket having one bracket portion connected to said housing, and another bracket portion connected to a cycle-type pedal-powered handle-barred vehicle to thereby mount said siren-type sound generating means on a prominent forward region of the cycle-type vehicle.

2. The attachment as defined in claim 1, wherein said housing is elongated and has one generally cylindrical end portion and an opposite end portion which flares outwardly in direction away from said generally cylindrical end portion.

3. The attachment as defined in claim 1, wherein said oscillator means includes a pair of transistors each having a base, a collector and an emitter; and wherein the collectors are operatively connected to a terminal of predetermined polarity of said dc battery power source; and wherein the emitters are operatively connected to another terminal of the power source of polarity opposite to said predetermined polarity; and wherein the bases are operatively connected to each other, and wherein the base of one of said transistors is operatively connected to the collector of the other of said transistors.

4. The attachment as defined in claim 3, wherein said siren-type sound generating means further includes a driver amplifier having an input operatively connected to the base of said other transistor, and an output operatively connected to said loudspeaker means.

5. The attachment as defined in claim 1, wherein said switching means includes a pair of transistors each having a base, a collector and an emitter; and wherein the collectors are operatively connected to a terminal of predetermined polarity of said dc battery power source; and wherein the emitters are operatively connected to another terminal of the power source of polarity opposite to said predetermined polarity; and wherein the bases are operatively connected to each other, and wherein the base of one of said transistors is operatively connected to the collector of the other of said transistors, and wherein the collector of said one transistor is operatively connected to the base of said other transistor.

6. The attachment as defined in claim 1, and wherein said feedback means includes a feedback circuit comprised of a resistor and a capacitor connected in parallel with said resistor, said feedback circuit being operatively connected between said oscillator means and said switching means.

7. The attachment as defined in claim 2, wherein said loudspeaker means includes a loudspeaker cone at said flaring end portion of said housing, a portective cover having a plurality of relatively large-sized holes through which the siren-type sound is transmitted, and a protective screen intermediate said protective cover and said loudspeaker cone, said screen having a multitude of relatively smaller-sized apertures for preventing dust particles smaller than said large-sized holes but greater than said smaller-sized apertures from reaching said loudspeaker cone.

8. The attachment as defined in claim 7, wherein said protective cover has a central outwardly-extending projection for diverting oncoming air flow during forward movement of the cycle-type vehicle in direction generally radially away from said loudspeaker cone.

9. The attachment as defined in claim 1, wherein said housing is elongated and comprises longitudinally-extending partition wall means of one-piece with said housing and operative for subdividing the interior of said housing into separate compartments, one of said compartments being elongated and having an open end region and an opposite end region, and wherein said carrier is mounted for sliding movement in said one compartment through said open end region of the latter.

10. The attachment as defined in claim 9; and further comprising anti-tampering safety means for preventing unauthorized contact with said components on said carrier, said safety means including a transversely-extending abutment wall of one-piece with said housing and with said partition wall means, said abutment wall overlying said opposite end region of said one compartment; and wherein said safety means further includes a transversely-extending shield wall mounted on said movable carrier, said shield wall being located intermediate said components and said abutment wall to thereby protect said components from unauthorized contact.

11. The attachment as defined in claim 9, wherein said dc battery power source includes a pair of batteries; and further comprising a battery holder in which said batteries are supported, said battery holder being receivable in another of said compartments.

12. The attachment as defined in claim 11, wherein said housing further includes a plurality of longitudinally-extending ribs of one-piece with said housing, each rib extending generally radially inwardly into said other compartment to thereby prevent unauthorized lateral displacement of said battery holder within said other compartment.

13. The attachment as defined in claim 1, wherein said element of the multi-element steering means is a handlebar adapted to be grasped by a child's hand, and wherein said actuating means is a momentary action push button electrical switch; and further comprising means for mounting said switch on said handlebar at a position remote from said housing to thereby grant a user easy access to said switch.

14. The attachment as defined in claim 13, wherein said switch mounting means includes a casing on which said switch is mounted, a pair of clamping arms depending from opposite sides of said casing, and clamping means for urging said arms towards each other and into clamping engagement with said handlebar.

15. The attachment as defined in claim 14, wherein said handlebar has a generally annular configuration, and wherein each clamping arm has a generally semicircular section for closely embracing a respective circumferential portion of said handlebar.

16. The attachment as defined in claim 13, wherein said switch mounting means is operative to mount said switch at any selected position along the length of said handlebar, and wherein said electrical circuit means includes a flexible electrical cable which spans the distance between said selected position of said switch and said position of said housing.

17. The attachment as defined in claim 1, wherein said housing is elongated along an axis of symmetry and includes a mounting portion of one-piece with and extending in generally radial direction outwardly of said housing, said mounting portion having a transversely-extending passage formed with opposite open ends.

18. The attachment as defined in claim 17, wherein said one bracket portion of said mounting bracket includes a pair of flange arms on opposite sides of said mounting portion, each flange arm having a through-hole which overlies and is registered with a respective open end of said passage; and wherein said kit means further includes means for adjustably orienting said housing on said steering means by tilting said axis of symmetry relative to the surface to be traversed, including an elongated pivot element which extends through said passage and said holes and which defines a pivot axis along its elongation, and a movable locking element mounted on said pivot element for movement lengthwise of the latter between a non-locking position in which said housing is free to pivot about said pivot axis, and a locked position in which undesired pivoting movement of said housing about said pivot axis is prevented.

19. The attachment as defined in claim 18, wherein said multi-element steering means includes a steering column element and a fastener element threadedly mounted on the latter, said fastener having a head and a threaded rod-shaped stem, and wherein said other bracket portion of said mounting bracket has a slide lug formed with a U-shaped recess dimensioned to receive said stem underneath said head.

20. The attachment as defined in claim 19, wherein said mounting bracket includes a generally planar body portion, and wherein said flange arms project generally normally of said planar body portion at one end region of the latter, and wherein said U-shaped recess lies in a plane generally parallel to that of said planar body portion at the opposite end region of the latter.

21. The attachment as defined in claim 18, wherein said multi-element steering means includes a steering column having a generally annular cross-section, and wherein said other bracket portion of said mounting bracket has a pair of arcuate clamping portions; and wherein said kit means further includes clamping means for urging said clamping portions towards each other and into clamping engagement with the exterior circumferential surface of said steering column.

22. The attachment as defined in claim 21, wherein said mounting bracket includes a pair of bracket members, each bracket member having a respective flange arm at one end region of the respective bracket member, and a respective arcuate clamping portion at the opposite end region of the respective bracket member.

23. The attachment as defined in claim 18, wherein said multi-element steering means includes a synthetic plastic material steering assembly, and wherein said other bracket portion of said mounting bracket has a slide lug formed with a U-shaped recess; and wherein said kit means further includes a fastener element threadedly mounted on said steering assembly, said fastener having a threaded rod-shaped stem receivable in said recess, and a head for clamping said lug when said fastener is threaded into said steering assembly.

24. The attachment as defined in claim 23, wherein said kit means further includes a shakeproof lock washer for tightly securing said fastener element on said steering assembly.

25. The attachment as defined in claim 2; and further comprising a detachable turn-type cover having a pair of inwardly-directed projections; and wherein said housing has a pair of notches at said cylindrical end portion of said housing, each notch having a first longitudinally-extending section for receiving the respective projection, and a second circumferentially-extending section for locking said cover on said cylindrical end portion when said cover is turned in circumferential direction.

26. An attachment for cycle-type pedal-powered handle-barred vehicles, particularly bicycles, tricycles and low-slung children's vehicles, of the type having child hand-operated multi-element means for steering the cycle-type vehicles over a surface to be traversed, the attachment comprising:
 (a) a synthetic plastic material housing elongated along an axis of symmetry and having
  (i) a generally cylindrical end portion and an opposite end portion which flares outwardly in direction away from said generally cylindrical end portion,
  (ii) longitudinally-extending partition wall means of one-piece with said housing and operative for subdividing the interior of said housing into separate compartments, one of said compartments being elongated and having an open end region and an opposite end region, and
  (iii) a mounting portion of one-piece with and extending in generally radial direction outwardly of said housing, said mounting portion having a tranversely-extending passage formed with opposite open ends;
 (b) a unitary carrier mounted for sliding movement in said one compartment through said open end region of the latter;
 (c) multi-component means for electronically generating a variable pitch ululating siren-type sound, including
  (i) oscillator means for generating an audio carrier signal having a predetermined frequency,
  (ii) switching means for generating a modulating signal having a frequency less than said predetermined frequency,
  (iii) said oscillator means and said switching means including a plurality of actuatable transistor components, resistor components and capacitor components all mounted on said unitary carrier,
  (iv) feedback means for electrically interconnecting said components to thereby modulate said audio carrier signal with said modulating signal, and
  (v) loudspeaker means on said housing for converting the modulated carrier signal to the siren-type sound;
 (d) a small light dc battery power source receivable in said housing, including
  (i) a pair of batteries, and
  (ii) a battery holder in which said batteries are supported, said holder being receivable in another of said compartments within said housing;
 (e) anti-tampering safety means for preventing unauthorized contact with said components on said carrier, said safety means including
  (i) a transversely-extending abutment wall of one-piece with said housing and with said partition wall means, said abutment wall overlying said opposite end region of said one compartment, and
  (ii) a transversely-extending shield wall mounted on said movable carrier, said shield wall being located intermediate said components and said abutment wall to thereby protect said components from unauthorized contact;
 (f) means for actuating said components of said siren-type sound generating means, including
  (i) normally-open electrical circuit means for normally disconnecting said power source from said components to thereby minimize battery drain, and
  (ii) hand-operated switching means for closing said normally-open circuit means to thereby connect said power source with said components and generate the siren-type sound;
 (g) means for adjustably mounting said actuating means at any selected position along the length of a handlebar element of the multi-element steering means to thereby grant a user easy access to said actuating means, including
  (i) a casing on which said switching means is mounted, (ii) a pair of clamping arms depending from opposite sides of said casing, and
(iii) clamping means for urging said arms towards each other and into clamping engagement with said handlebar element; and
(h) multi-part kit means for mounting said housing at a highly visible and elevated position on the steering means, including
(i) a mounting bracket having one bracket portion connected to said housing, and another bracket portion connected to a cycle-type pedal-powered handle-barred vehicle to thereby mount said siren-type sound generating means on a prominent forward region of the cycle-type vehicle, said one bracket portion of said mounting bracket having a pair of flange arms on opposite sides of said mounting portion, each flange arm having a through-hole which overlies and is registered with a respective open end of said passage, and
(ii) means for adjustably orienting said housing on said steering means by tilting said axis of symmetry relative to the surface to be traversed, including
(A) an elongated pivot element which extends through said passage and said holes and which defines a pivot axis along its elongation, and
(B) a movable locking element mounted on said pivot element for movement lengthwise of the latter between a non-locking position in which said housing is free to pivot about said pivot axis, and a locked position in which undesired pivoting movement of said housing about said pivot axis is prevented.

27. A siren-type sound generating device for attachment on cycle-type pedal-pedal powered handle-barred vehicles particularly bicycles, tricycles, and low-slung children's tricycles, of the type having hand-operated steering means for steering the vehicle, comprising:
(a) A synthetic plastic material housing;
(b) A carrier receivable with clearance in said housing for easy insertion and removal therefrom;
(c) multi-component means for electronically generating a variable pitch ululating siren-type sound, including
(i) oscillator means for generating an audio carrier signal having a predetermined frequency.
(ii) switching means for generating a modulating signal having a frequency less than said predetermined frequency,
(iii) said oscillator means and said switching means including a plurality of actuatable transistor components, resistor components and capacitor components, all mounted on said carrier
(iv) feedback means for electrically interconnecting said components to thereby modulate said audio carrier signal with said modulating signal, and
(v) loudspeaker means on said housing for converting the modulated carrier signal to the siren type sound;
(d) a small light dc battery power source receivable with clearance in said housing for easy insertion and removal therefrom;
(e) means for actuating said components of said siren-type sound generating means, including
(i) normally-open electrical circuit means for normally disconnecting said power source from said components to thereby minimize battery drain, and
(ii) hand-operated switching means mountable on the vehicle steering means within hand-reach of the rider of the vehicle for closing said normally-open circuit means to thereby connect said power source with said components and generate the siren-type sound; and
(f) means for mounting said housing at a highly visible and elevated position in the steering means, including a mounting bracket having one bracket portion connectable to the housing, and another bracket portion connectable to the vehicle to thereby mount the device on a prominent forward region of the vehicle.

* * * * *